Aug. 18, 1925.
I. H. ATHEY
1,549,741
BUNK FOR VEHICLES
Filed July 25, 1922 2 Sheets-Sheet 1
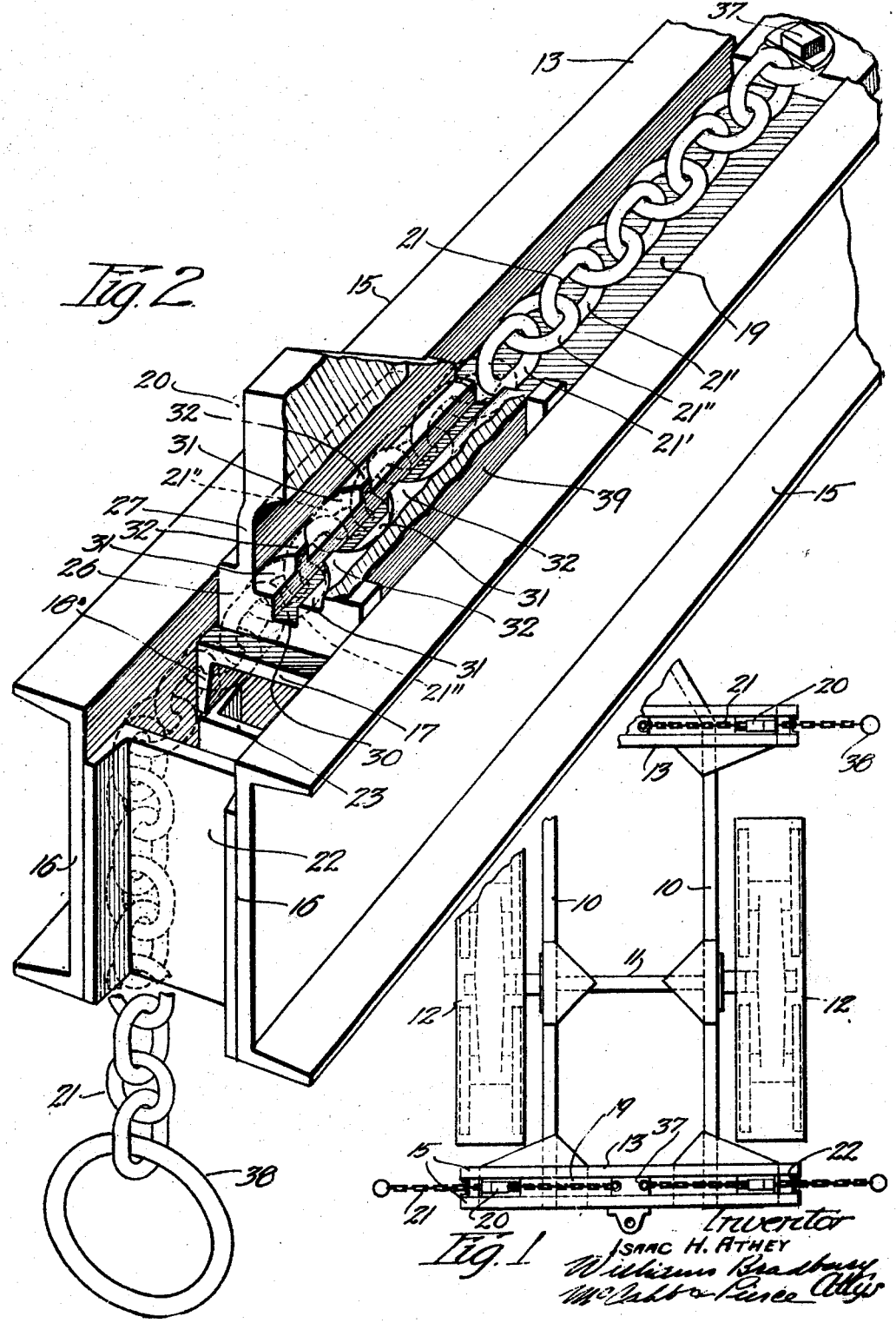

Aug. 18, 1925.
I. H. ATHEY
BUNK FOR VEHICLES
Filed July 25, 1922
1,549,741
2 Sheets-Sheet 2
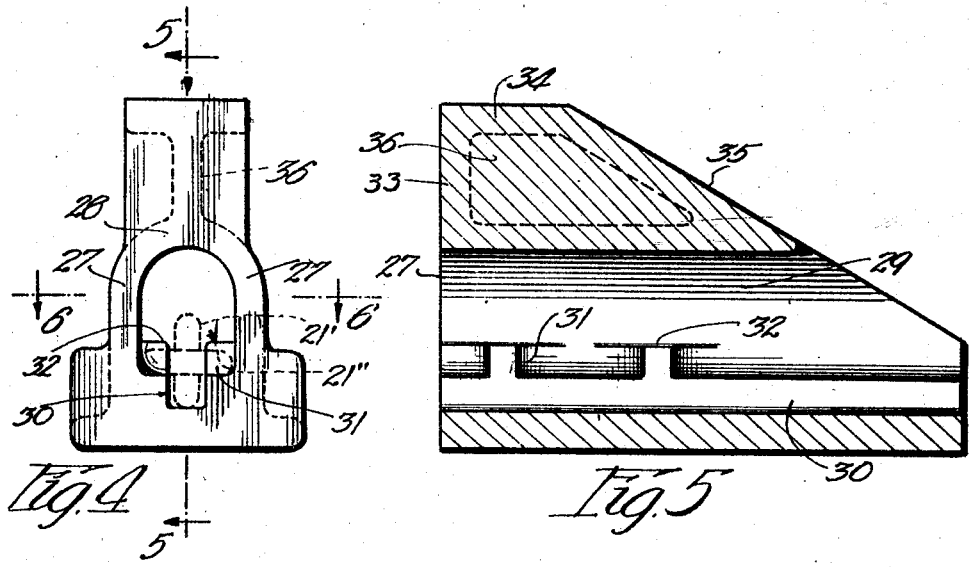
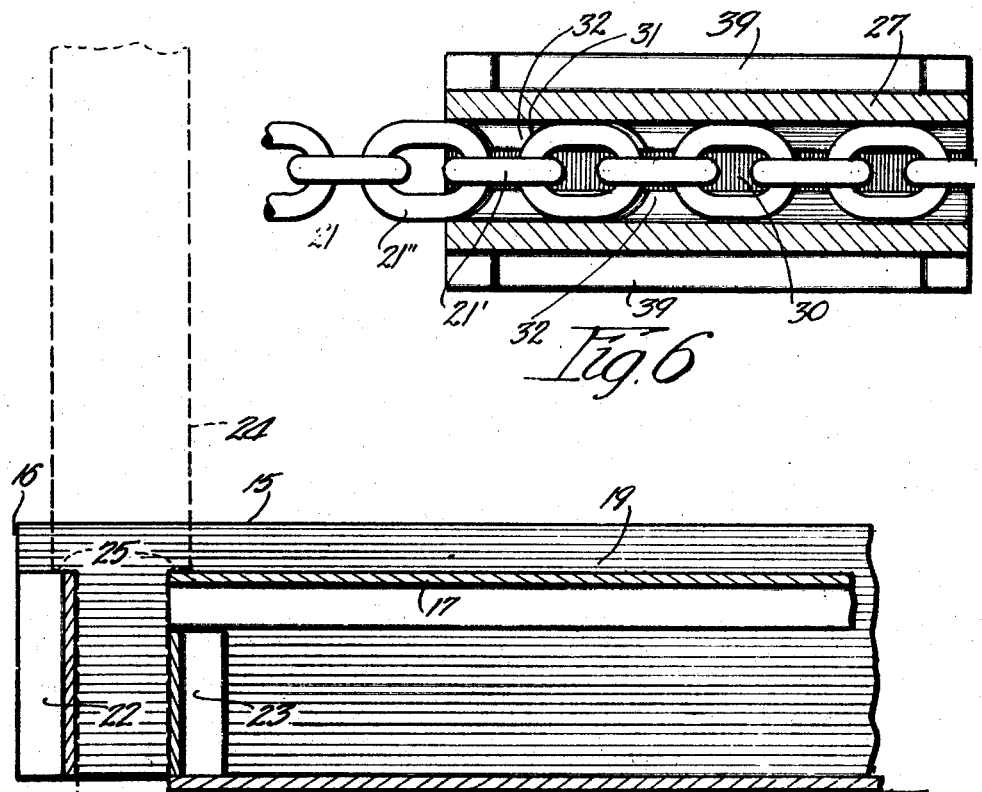
Inventor
ISAAC H. ATHEY Patented Aug. 18, 1925.

1,549,741

UNITED STATES PATENT OFFICE.

ISAAC H. ATHEY, OF CHICAGO, ILLINOIS, ASSIGNOR, BY MESNE ASSIGNMENTS, TO ATHEY TRUSS WHEEL CO., OF CHICAGO, ILLINOIS, A CORPORATION OF ILLINOIS.

BUNK FOR VEHICLES.

Application filed July 25, 1922. Serial No. 577,268.

*To all whom it may concern:*

Be it known that I, ISAAC H. ATHEY, a citizen of the United States, and resident of Chicago, in the county of Cook and State of Illinois, have invented a certain new and useful Improvement in Bunks for Vehicles, of which the following is a full, clear, concise, and exact description, reference being had to the accompanying drawings, forming a part of this specification.

My invention relates to improvements in bunks for vehicles. Some of the objects of my invention are to provide a bunk which is simple in construction and so designed as to afford maximum strength, the parts being so arranged as to provide novel means for supporting the upper ends of the skids used for rolling logs and other similar objects on to the vehicle and for receiving the stakes where stakes are used for retaining a load. Another object of my invention is to provide a bunk comprising an adjustable load-retaining block mounted on each end thereof, and means whereby this block can be easily and quickly adjusted longitudinally of the bunk and locked in its adjusted position, the locking means being so designed as to permit its quick and easy release when it is desired to unload the vehicle.

Other objects of my invention will appear as this description progresses, reference being had to the accompanying drawings, in which Figure 1 is a plan view of a vehicle equipped with my improved bunk;

Figure 2 is a perspective view of the bunk, portions thereof being broken away;

Figure 3 is a central longitudinal section through the bunk, showing the means which I provide for receiving a load-supporting stake;

Figure 4 is an end view of one of the adjustable blocks forming my improved bunk;

Figure 5 is a central longitudinal section therethrough; and

Figure 6 is a horizontal section taken on the line 6—6 of Figure 4.

Throughout the several views similar reference characters will be used for referring to similar parts.

The vehicle in connection with which I have illustrated my improved bunk comprises the spaced parallel side members 10, which are mounted on the axle 11, which in turn is supported by the wheels 12, which are here illustrated as being of the endless track variety. Secured to the opposite ends of the frame members 10 in any suitable manner are the bunks 13 embodying my invention. These bunks each comprise two channel-shaped beams 15 which are arranged in spaced parallel relation with their bottoms 16 opposed to each other. An inverted channel 17 is positioned between the two beams 15 and has each of its flanges 18 secured to the bottom or web of the adjacent beam 15, either by riveting, by welding, or in any other suitable manner. The inverted channel 17 is positioned so that its bottom is spaced inwardly from the upper flanges of the beam to form a trough 19 for receiving the adjustable load-retaining block 20 and the chain 21, whereby the block is adjusted and retained in its adjusted position.

A short channel beam section 22 is positioned between the ends of the beams 15 at each end of the bunk, this section extending vertically and having each of its flanges welded, riveted or otherwise secured to the adjacent bottom 16 of the beams 15. The upper end of this channel section preferably lies in the plane of the bottom of the inverted channel 17. A shorter channel beam section 23 is similarly secured to the beams 15 in inwardly spaced relation to the section 22, so as to form a socket for the stake 24 (see Figure 3) which should be provided with the shoulders 25 for supporting the stake, the shoulders resting upon the top of the section 22 and the bottom of the inverted channel 17.

It will be clear from the above description of the construction of the bunk that the upper end of a skid, such as is ordinarily used for loading logs on a vehicle, can rest upon the upper end of the section 22 and will be held against lateral movement thereon by the bottoms of the channels 15. It is customary to provide the upper ends of skids with hooks for engaging over some part of the frame work of the vehicle and hooks thus provided can be hooked over the upper end of the bottom of the channel section 22.

Each of the blocks 20 comprises an elongated base portion 26, which slides in the trough 19 on the inverted channel 17. A longitudinally extending wall 27 extends upwardly from each edge of the base 26 and is joined by the arch 28, thus forming a longitudinally extending passageway 29 through the block.

A longitudinally extending groove 30 is formed in the upper face of the base 26 for receiving the lower portions of the vertically positioned links 21' of the chain 21. Adjacent its upper edge each side or wall of the groove is cut away, as shown at 31, thereby forming two pairs of inwardly extending oppositely disposed projections 32, the two pairs of projections being spaced from each other longitudinally of the block, thereby forming a pocket for receiving one of the horizontal links 21'' of the chain 21, which is shown in dotted outline in Figure 2. Another one of the horizontal links 21'' will abut against the outer sides of the outer pair of projections 32, as shown in Figure 2. A transversely extending flange 33 extends upwardly from the outer end of the arch 28, then inward horizontally, as shown at 34, (see Figure 5) and then inclines downwardly, as shown at 35, to the opposite end of the arch, the inner ends of the walls 27 being inclined to form a continuation of the flange 35, as shown in Figure 5. A web 36 extending upwardly from the top of the arch 28 serves to support and reinforce the flanges 33, 34 and 35.

The inner end of each chain 21 may be secured to the bottom of the inverted channel 17 at substantially its center point by means of a bolt 37, or in any other suitable manner, and the outer end thereof is preferably provided with an enlarged link 38 which acts as a stop to prevent the loss of the block 20 from the chain 21 when the block is not in position on the bunk, which is the case when the vehicle is being unloaded.

Before a vehicle embodying my improved bunk is loaded, the chain 21 is placed in the trough 19 at each end of the bunk and the block swings on the vertically depending portion of the chain. After the logs, or other similar objects, have been rolled onto the bunk, each block 20 is placed in the outer end of its trough 19 and pushed inwardly until the inclined face 35 thereof contacts with the load, whereupon the chain is pulled taut and adjusted to bring one of the horizontal links 21'' into the pocket formed by the two pairs of projections 32 and another link 31 resting against the outer pair of projections 32, as shown in Figure 2, thereby locking the bunk against outward displacement.

When it is desired to unload the vehicle, all that is necessary to do to release the block 20 is to grasp the outer end of the chain, preferably by taking hold of the link 38 and giving the outward end a quick upward and then a quick downward movement. The momentum of the upwardly moving portion of the chain will be sufficient to disengage the chain from the projections 32 of the block and permit the block to be moved outwardly.

It should be noted that the longitudinal sides of the base 26 of the block are cut away, as shown at 39, (see Figures 2 and 6). This is for the purpose of reducing the friction between the sides of the base and the bottoms of the channels 15.

While I have described the details of construction of the preferred embodiment of my invention and its mode of operation, it is to be clearly understood that my invention is not limited to these details, but is capable of other adaptations and modifications within the scope of the appended claims.

Having thus described my invention, what I claim is:

1. A bunk for a vehicle comprising two channel-shaped beams arranged in spaced parallel relation with their bottoms opposed to each other, an inverted channel positioned between said beams and having its respective flanges secured to the adjacent bottoms of said beams, the bottom of said inverted channel being spaced inwardly from the upper flanges of said beams to form a trough, a short channel section positioned between said beams at each end of said bunk in outwardly spaced relation to the adjacent ends of said inverted channel and having its respective flanges secured to the adjacent bottoms of said beams, a block slidably mounted in said trough and having an outwardly and upwardly inclined load-supporting flange, said block having a longitudinally extending passageway therethrough, the bottom of said passageway having a groove formed therein, the tops of the sides of said groove being cut away to form two longitudinally spaced pairs of opposed projections which together form a pocket, and a chain having one end secured adjacent the center of said bunk, the free end of said chain extending through the passageway in said block and having links adapted to be received by the pocket of said block, the outer end of said chain having means for preventing it from being pulled through the passageway in said block.

2. A bunk for a vehicle comprising two channel-shaped beams arranged in spaced parallel relation with their bottoms opposed to each other, an inverted channel positioned between said beams and having its respective flanges secured to the adjacent bottoms of said beams, the bottom of said inverted channel being spaced inwardly from the upper flanges of said beams to form a trough, a block slidably mounted in said trough and having an outwardly and upwardly inclined load-supporting flange, said block having a longitudinally extending passageway therethrough, the bottom of said passageway having a groove formed therein, the tops of the sides of said groove being cut away to form two longitudinally spaced pairs of opposed projections which together form a pocket, and a chain having one end secured adjacent the center of said bunk, the free end of said chain extending through the passageway in said block and having links adapted to be received by the pocket of said block.

3. A bunk for a vehicle comprising two channel-shaped beams arranged in spaced parallel relation with their bottoms opposed to each other, an inverted channel positioned between said beams and having its respective flanges secured to the adjacent bottoms of said beams, the bottom of said inverted channel being spaced inwardly from the upper flanges of said beams to form a trough, a block slidably mounted in said trough, said block having a longitudinally extending passageway therethrough, the bottom of said passageway having a pocket formed therein, and a chain having one end secured adjacent the center of said bunk, the free end of said chain extending through the passageway in said block and having links adapted to be received by the pocket of said block.

4. A bunk for a vehicle comprising two channel-shaped beams arranged in spaced parallel relation with their bottoms opposed to each other, an inverted channel positioned between said beams and having its respective flanges secured to the adjacent bottoms of said beams, the bottom of said inverted channel being spaced inwardly from the upper flanges of said beams, and a short channel section positioned between said beams at each end of said bunk in outwardly spaced relation to the adjacent end of said inverted channel and having its respective flanges secured to the adjacent bottoms of said beams.

5. A bunk for a vehicle comprising two channel-shaped beams arranged in spaced parallel relation with their bottoms opposed to each other, a channel positioned between said beams and having its respective flanges secured to the adjacent bottoms of said beams, the bottom of said channel being spaced inwardly from the upper flanges of said beams, and a short channel section positioned between said beams at each end of said bunk in outwardly spaced relation to the adjacent end of said channel and having its respective flanges secured to the adjacent bottoms of said beams.

6. A bunk for a vehicle comprising two channel-shaped beams arranged in spaced parallel relation with their bottoms opposed to each other, a channel positioned between said beams and having its respective flanges secured to the adjacent bottoms of said beams, and a short channel section positioned between said beams at each end of said bunk, in outwardly spaced relation to the adjacent end of said channel, and having its respective flanges secured to the adjacent bottoms of said beams.

7. A bunk for a vehicle comprising two channel-shaped beams arranged in spaced parallel relation with their bottoms opposed to each other, and an inverted channel positioned between said beams and having its respective flanges secured to the adjacent bottoms of said beams, the bottom of said inverted channel being spaced inwardly from the upper flanges of said beams.

8. A bunk for a vehicle comprising two channel-shaped beams arranged in spaced parallel relation with their bottoms opposed to each other, and a channel longitudinally positioned between said beams and having its respective flanges secured to the adjacent bottoms of said beams, the bottom of said channel being spaced inwardly from the upper flanges of said beams and cooperating with the beams to form a trough adapted to receive a load-retaining block.

9. A bunk for a vehicle having a trough formed in its upper side, a chain adapted to lie in the trough and with one end anchored, and a load-retaining block slidably positioned in the trough and having a hole therethrough for the passage of the chain, the block having projections for engaging several chain links lying in one plane and anchoring the block thereto and a groove for receiving the chain links lying in another plane.

In witness whereof, I hereunto subscribe my name this 20 day of July, 1922.

ISAAC H. ATHEY.